United States Patent [19]

Cropek

[11] Patent Number: 4,898,047
[45] Date of Patent: Feb. 6, 1990

[54] CRANK AND SPROCKET DRIVE

[76] Inventor: Douglas A. Cropek, 6400 Oak Acorn Ct., Citrus Heights, Calif. 95621

[21] Appl. No.: 92,061

[22] Filed: Sep. 14, 1987

[51] Int. Cl.⁴ .............................................. G05G 1/14
[52] U.S. Cl. ................. 74/534.2; 280/256; 280/265; 280/261;74/534.1
[58] Field of Search ............................ 74/594.1–594.3; 280/256, 257, 259, 260, 261

[56] References Cited

U.S. PATENT DOCUMENTS

| 620,164 | 2/1899 | Mumford et al. | 74/594.3 |
|---|---|---|---|
| 621,883 | 3/1899 | Whitney et al. | 74/594.3 |
| 1,323,004 | 11/1919 | Boyd | 74/594.3 |
| 2,316,530 | 4/1943 | Nilsen | 74/594.3 |
| 3,779,099 | 12/1973 | Trammell | 280/256 X |
| 4,583,422 | 4/1986 | Boyd | 74/594.2 |

FOREIGN PATENT DOCUMENTS

| 9527 | 1/1928 | Australia | 74/594.3 |
|---|---|---|---|
| 634612 | 2/1928 | France | 74/594.3 |
| 889597 | 1/1944 | France | 74/594.3 |
| 9784498 | 4/1951 | France | 74/594.3 |
| 2409183 | 7/1979 | France | 74/594.2 |
| 366722 | 1/1939 | Italy | 74/594.3 |
| 450597 | 7/1949 | Italy | 74/594.3 |
| 237306 | 8/1945 | Switzerland | 74/594.3 |
| 22829 | 11/1896 | United Kingdom | 74/594.3 |
| 10754 | 4/1897 | United Kingdom | 74/594.3 |
| 6632 | 2/1898 | United Kingdom | 74/594.3 |

*Primary Examiner*—Vinh T. Luong
*Attorney, Agent, or Firm*—Joseph H. Smith

[57] ABSTRACT

Apparatus is provided for propelling a bicycle. In a preferred embodiment a crank and a sprocket are included which are rotatable relative to one another and have a common center of rotation. A guide fixedly attached to the sprocket constrains a sliding member having a hole through which an arm of the crank passes, such that rotation of the crank relative to the sprocket urges the sliding member along the guide. A compression spring disposed between a shoulder on the guide and the sliding member is compressed as the sliding member is urged along the guide. Hence, during a power stroke, an applied force on the crank causes the crank to advance rotationally ahead of the sprocket position during the first half of the stroke, urging the sliding member along the guide and compressing the spring. The spring stores the work of compression during the first half of the stroke as potential energy. During the second half of the stroke the spring releases the stored potential energy to the sprocket.

6 Claims, 14 Drawing Sheets

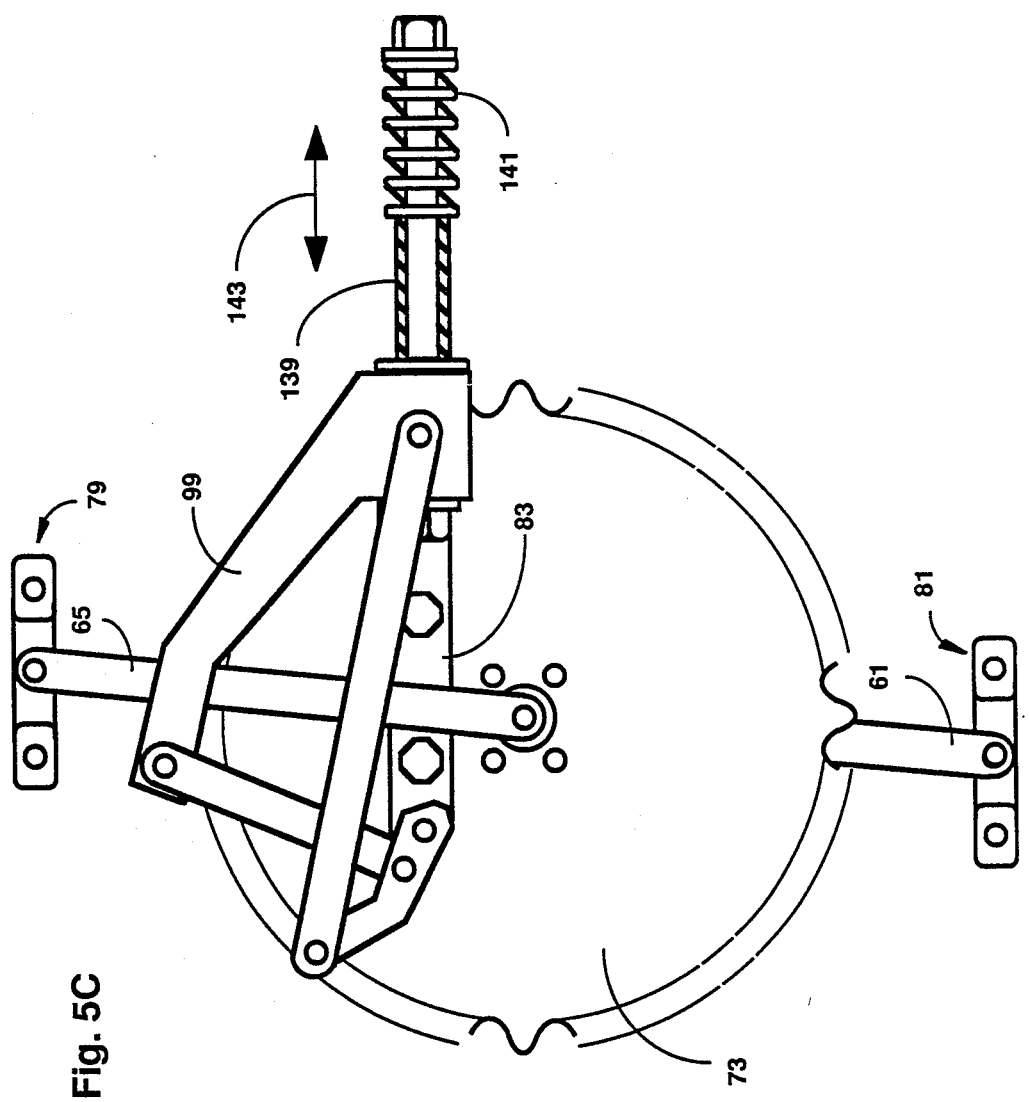

Fig. 10

| (1) θ1+θ2 (deg) | (2) θ1 (deg) | (3) θ2 (deg) | (4) Sine θ1+θ2 | (5) F2 θ1+θ2 (lbs) | (6) F3 (lbs) | (7) D2 (in) | (8) Sine θ1 | (9) F2 (Conv.) (lbs) |
|---|---|---|---|---|---|---|---|---|
| 0 | 0.00 | 0.00 | 0 | 0 | 0 | 0 | 0 | 0 |
| 10 | 7.51 | 2.49 | .1737 | 17.37 | 39.08 | .1737 | .1307 | 13.07 |
| 20 | 15.11 | 4.89 | .3420 | 34.20 | 76.95 | .3420 | .2607 | 26.07 |
| 30 | 22.88 | 7.13 | .5000 | 50.00 | 112.5 | .5000 | .3882 | 38.82 |
| 40 | 30.88 | 9.13 | .6428 | 64.28 | 144.63 | .6428 | .5131 | 51.31 |
| 50 | 39.16 | 10.84 | .7660 | 76.60 | 172.35 | .7660 | .6315 | 63.15 |
| 60 | 47.78 | 12.22 | .8660 | 86.60 | 194.85 | .8660 | .7406 | 74.06 |
| 70 | 56.78 | 13.22 | .9397 | 93.97 | 211.43 | .9397 | .8366 | 83.66 |
| 80 | 66.17 | 13.83 | .9848 | 98.48 | 221.58 | .9848 | .9147 | 91.47 |
| 90 | 75.96 | 14.04 | 1.000 | 100.0 | 225.00 | 1.000 | .9701 | 97.01 |
| 100 | 86.17 | 13.83 | .9848 | 98.48 | 221.58 | .9848 | .9978 | 99.78 |
| 110 | 96.78 | 13.22 | .9397 | 93.97 | 211.43 | .9397 | .9930 | 99.30 |
| 120 | 107.78 | 12.22 | .8660 | 86.60 | 194.85 | .8660 | .9522 | 95.22 |
| 130 | 119.16 | 10.84 | .7660 | 76.60 | 172.35 | .7660 | .8733 | 87.33 |
| 140 | 130.87 | 9.13 | .6428 | 64.20 | 144.63 | .6428 | .7562 | 75.62 |
| 150 | 142.88 | 7.13 | .5000 | 50.00 | 112.50 | .5000 | .6035 | 60.35 |
| 160 | 155.11 | 4.89 | .3420 | 34.20 | 76.95 | .3420 | .4209 | 42.09 |
| 170 | 167.51 | 2.49 | .1737 | 17.37 | 39.08 | .1737 | .2163 | 21.63 |
| 180 | 180 | 0.00 | .0000 | 0 | 0 | .0000 | 0 | 0 |

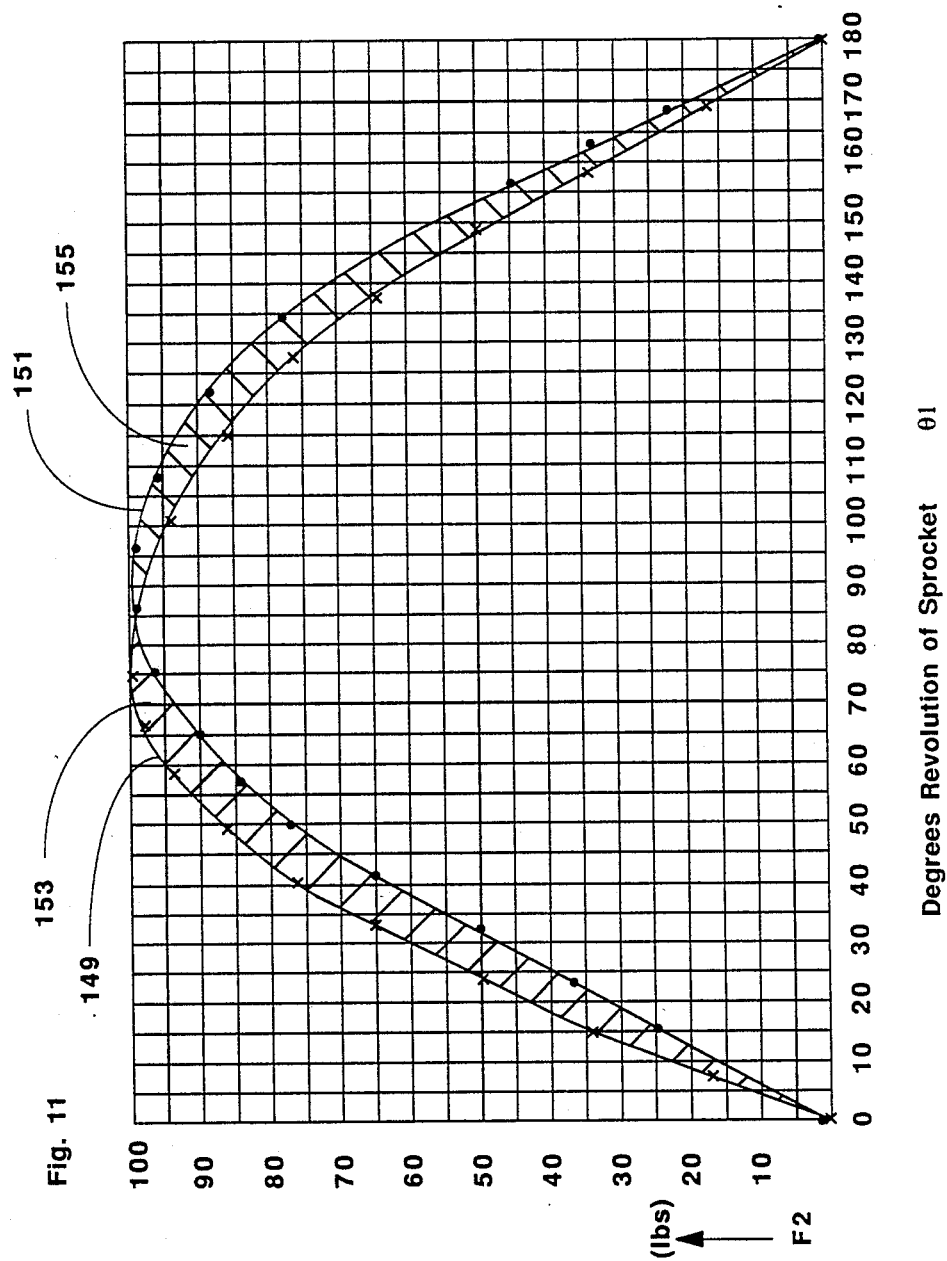

CRANK AND SPROCKET DRIVE

FIELD OF THE INVENTION

This invention pertains to the field of crank and pedal combinations for manually powering vehicles and machinery, and relates in a preferred embodiment to such a combination for powering a bicycle.

BACKGROUND OF THE INVENTION

Shown in FIG. 1 is a side elevation view of a crank, pedal and chain-sprocket drive in a conventional arrangement as typically used for manually powering a bicycle. FIG. 2 is a partial section elevation view of the assembly of FIG. 1 taken generally along the section line II—II of FIG. 1, and in the direction of the arrows.

As illustrated, chain-sprocket 11 has a working diameter D1, and is typically configured for No. 41 roller chain, although other sizes have been and are used for bicycle propulsion. Crank member 13 has a horizontal portion 29 that extends through a frame 25, and is engaged in the frame by means of ball bearings 27 and 35. Details of machining of races and shoulders on both crank portion 29 and the inside of the bore through frame 25 to effect the mounting of the ball bearings are not shown.

The crank has a flanged portion 21 near one end of horizontal portion 29, and sprocket 11 is fixedly attached to flange 21 by means of fasteners such as fastener 15. The plane of flange 21, and hence the plane of chain-sprocket 11, are at right angles to portion 29 of crank 13.

Beyond the bearing mounting and the sprocket mounting, crank 13 turns at right angles to portion 29 and forms a crank arm of length L ending in a pivot mounting 19 to which a pedal assembly 17 is rotationally attached. At the other side of frame 25 the crank makes a similar bend, also at right angles to portion 29, but in the direction opposite the first crank arm. The second crank arm is also of length L and ends in a secondary rotationally mounted pedal assembly 31. The crank arm on the sprocket side has a projection 33 which extends through an opening in sprocket 11 and helps to transfer torque from the crank to the sprocket in use, so that all the torque is not transmitted through the screw fasteners, such as fastener 15, that attach the sprocket to the crank. In some crank and sprocket arrangements the projection to the sprocket fastens to the sprocket by conventional fasteners, and in some no such projection is used. Also, the sprocket and crank may be a single unit formed from a machined casting, or by other means. In many arrangements there is a single sprocket, and in many arrangements there are multiple sprockets of different diameters mounted side by side with a deraileur mechanism operable by the rider of the bicycle to move the drive chain from one sprocket to another to change the mechanical advantage of the drive train.

The arrangement of the crank, pedals and sprocket is such, as is best illustrated by FIG. 1, that the rider of the bicycle may exert force in a generally downward direction on the pedal at the end of one extension of the crank, and that force, represented by force F1 in FIG. 1, will be translated to a varying torque on chain-sprocket 11 as the crank rotates and the bicycle is propelled forward. The torque exerted on sprocket 11 by the crank is converted to a force in an endless chain (not shown) which becomes a torque in a rear sprocket (also not shown) which drives a rear wheel of the bicycle.

Rotation of crank 13 is shown in FIG. 1 beginning arbitrarily as zero rotation with the crank arm on the sprocket side extending vertically upward. Rotation proceeds, also arbitrarily, in the direction of arrow 23, and the amount of rotation is shown in radians for each one-quarter of a revolution through a first full revolution. The crank arm on the sprocket side is shown in FIG. 1 at an angle O from the vertical, and O is meant to represent any rotation from zero to one-half revolution. When the sprocket-side crank arm has revolved through one-half revolution, and points vertically downward, the opposite side crank arm (ending in pedal 31) will point vertically upward, and the bicycle rider then typically shifts his force to this opposite pedal for the next one-half revolution.

It is quite true that a rider may exert more or less force on a pedal, and the force may not necessarily be directed exactly vertically downward. It is also true that the force exerted over a half-revolution will vary both in direction and amplitude, and there may be many force patterns exerted by a rider. For purposes of calculation and comparison, however, it is convenient to consider the force as a constant force exerted vertically downward.

To understand the operation of the conventional pedal and crank arrangement of the prior art, it is convenient to apply engineering and mathematical concepts of force, work and power. Force F1 is exerted on pedal 17 in FIG. 1, and force is transferred to the crank at rotational connection 19. The force on the crank arm may be resolved by the methods of vectorial combination into two forces, one in a direction along the axis of the crank arm and the other at right angles to the crank arm. It may be shown that at $\theta = 0$, with the crank arm vertically upward, force F1, which is shown vertically downward, will have no component at right angles to the crank, and the entire force will be along the crank axis toward the frame. This condition is shown by FIG. 3A. As the crank rotates, $\theta$ becomes greater than zero, and FIG. 3B shows a force vector diagram for an approximate angular rotation of 30 degrees. At this position of angular rotation, force F1 has a component F2 at right angles to crank 13, and a component F3 along the axis of the crank arm toward the frame. Force F3, passing through the center of rotation of the crank, provides no rotational torque to the crank and sprocket assembly. It may be shown that the instant force F3, at the position shown, has no propulsive effect on the bicycle, even though force F3 may have a component in the direction of movement of the bicycle (or in the opposite direction). This is so, because for the rider to exert this force on the frame, an equal and opposite force must be exerted elsewhere on the frame, or the rider would else not move along with the bicycle. The instant force F2, at right angles to the crank arm, is actually exerted at the rotational attachment point 19, and provides a rotational couple to the crank equal in magnitude to F2 * L.

As rotation continues, F1 remaining consant in magnitude and downward direction, F2 perpendicular to the crank arm increases in magnitude and F3 along the crank arm axis toward the frame decreases in magnitude, until, at 90 degrees rotation ($\theta = \pi/2$), F3 becomes zero, and F2 becomes F1, as is shown in FIG. 3C. At this point in rotation the torque applied to the crank and sprocket assembly is maximum at F1 * L.

When rotation of the crank is beyond the 90 degree point, component F2 perpendicular to the crank arm begins to decrease from the maximum magnitude, and F3 reappears, but in the direction along the crank arm axis away from the frame. The situation at $\theta = 3\pi/4$ (135 degrees) is shown in FIG. 3D. Force F2, which is in reality applied at rotational point 19, provides an instantaneous torque equal to F2 * L, and the force F3, which passes through the axis of rotation of the crank and sprocket assembly, provides, as before, no propulsive effect. At $\theta = \pi$ (180 degrees), which is one-half revolution of the crank and sprocket assembly, shown in FIG. 3E, the entire force F1 is along the axis of the crank, away from the frame, and there is no component at right angles to the crank arm. There is therefore no propulsive torque applied at this point.

At the point shown in FIG. 3E, one-half revolution, the opposite side crank arm is vertically upward, and the rider shifts his application of force to that side. The force components and torque effects for the second half revolution follow exactly the diagrams presented as FIGS. 3A and 3E.

Mathematically, the general case can be expressed from FIG. 3B, with $\theta$ representing any angle of rotation from 0 degrees through (and including) 180 degrees (one-half revolution, for which $\theta = \pi$). Of primary interest is the magnitude of F2, which determines the magnitude of torque applied to the crank arrangement. The vector right triangle formed by the force vectors has F1 as hypotenuse, and angle $\theta$ is the angle between F1 and F3. By definition of the Sine function in trigonometry, $F2 = F1*Sin\theta$. As $\theta$ increases from 0 degrees, $Sin\theta$ increases from zero to a maximum value 1 at $\theta = 90$ degrees ($\pi/2$ radians). So at 90 degrees $F2 = F1$, and F3 disappears.

The case for the second quarter revolution from $\theta = 90$ degrees to $\theta = 180$ degrees can be expressed from FIG. 3D, for which $\theta$ is between these two values. In FIG. 3D $\theta$ is greater than 90 degrees, and is therefore larger than any of the internal angles of the vector right triangle of F1, F2 and F3. Considering the vector right triangle, again by the definition of the Sine function in trigonometry, the force F2 perpendicular to the crank arm can be expressed as a function of the applied force F1, as $F2 = F1*Sin\beta$. The angle $\beta$ is the angle between the vectors F1 and F3. By trigonometry it can be shown that $\beta = 180$ degrees $-\theta$, and that $Sin(180$ degrees $-\theta)$ is always equal to $Sin\theta$. Therefore, for rotation between 90 degrees and 180 degrees, $F2 = F1*Sin\theta$, just as was true for rotation between zero and 90 degrees. The relationship $F2 = F1*Sin\theta$ therefore holds for all points of rotation between zero and 180 degrees, and the torque applied to the sprocket for all such points of rotation of one arm of the crank is $T = F1*L*Sin\theta$.

Since the force and torque analysis for the opposite crank arm to which force F1 is shifted as $\theta$ reaches 180 degrees is identical to the analysis just done for the first crank arm, the torque applied for the second half revolution of the crank follows the same relationship as for the first half revolution. The Sine function is a harmonic function related to revolution. A plot of the torque producing force F2, or of torque (since L is constant) applied to the sprocket by application of a constant force F1 downward on the pedal of one crank arm during rotation of that crank arm between zero and 180 degrees, then transferring that force to the opposite crank arm for its rotation between zero and 180 degrees, the two half revolutions making one complete revolution of the sprocket, is approximately as shown in FIG. 4. Torque or Force F2 is the ordinate (vertical axis), and revolutions of the sprocket is the abcissa (horizontal axis). For each half revolution of the sprocket the torque or force describes the positive half of a full revolution Sine function. The function reaches zero for each half revolution, but never goes negative (as does a true Sine function) because the driving force F1 is shifted each half revolution to the opposite pedal, keeping the torque positive.

The graph of FIG. 4 showing the force and torque variations for the idealized case as a function of sprocket revolution can also be used to illustrate the work done by a rider in propelling the bicycle. The engineering definition of work is: The product of a force exerted on a body and displacement of the body in the direction of the force. In the present case, the force which does work is the force F2 directed at right angles to one or the other of the two arms of the crank. Rotation of the crank and sprocket assembly around the rotational axis in the frame bearings provides movement of the point of application of the force F2 always in a circular arc at a distance L from the center of rotation, which is the length of either crank arm, and is always in the direction of application of Force F2.

Applying the concepts of differential and integral calculus, in any instant of rotation through an infinitesimal angle $d\theta$, the instant variable force, F2, is applied to the crank arm at point 19; and the distance along the curved path that point 19 moves relative to the rotational center is $Ld\theta$, because the length of an arc is the radius of the arc times the angular revolution in radians. The differential (instantaneous) work done is therefore:

$$dW = F2*Ld\theta$$

Since the variable force F2 can be expressed as a function of the applied force F1, as $F2 = F1*Sin\theta$, the differential expression for the work done becomes:

$$dW = F1*L*Sin\theta*d\theta$$

Integration applied to determine the work done between $\theta = 0$ and $\theta = \frac{1}{2}$ revolution then yields:

$$dW = F1*L*\int_{\theta=0}^{\theta=\pi/2} Sin\theta \, d\theta$$

or $W = F1*L*\{[-Cos\theta]\theta = \pi/2 - [-Cos\theta]\theta = 0\}$ for which $W = F1*L*\{[-(-1)]-[0]\} = F1*L*(1-0)$ i.e. $W = F1*L$ for one half revolution of the sprocket. It follows therefore, that for the idealized case, the work for a full revolution of the sprocket is $2F1*L$; and, if N is the number of sprocket revolutions, the total work done through multiple revolutions will be:

$$W_T = 2N*F1*L$$

In the graph of FIG. 4, since the torque multiplied by the angular travel is the same as the force F2 multiplied by the arc length, any very small area under the curve, such as blackened area 37, may represent the differential $F1*L*Sin\theta*d\theta$, with the height D2 equal to $F1*L*Sin\theta$, and the width D3 equal to the vanishingly small $d\theta$. The value of the definite integral between $\theta = 0$ and $\theta = \pi/2$, which is the work done for $\frac{1}{2}$ revolution, is the entire shaded area under the torque curve bounded by the curve and the zero torque axis, denoted area 39 in FIG. 4.

As an example, if a rider provides a downward constant force of 20 pounds (9.072 Kg.) on the pedals, with a crank length of 9 inches (0.75 ft., 22.86 cm.), and the rider travels a distance requiring 1000 revolutions of the sprocket, the work done will be:

$$W = 2*1000*20*.75 = 30,000 \text{ Ft-Lbs.}$$

or PST/W = 4150 KG-M = 40,680 Joules

Power is the rate of doing work. If the rate in the example is one revolution of the crank per second, the 1000 revolutions are accomplished in 1000 seconds with 30,000 Ft-Lbs of work performed. The power is 30 Ft-Lbs/sec., which is 0.055 Horsepower.

For the purpose of this specification a power stroke is defined as the application of a downward force by a rider on a pedal at the end of one crank arm over the time for the crank arm to revolve from a vertical up position to a vertical down position. The variations in moment force F2 and torque over that period, assuming the force applied is vertically downward and constant over the period, are shown in the part of the graph of FIG. 4 from 0 revolutions of the crank to ½ revolution. The work done over that period is represented by the shaded area under the curve, and has been shown to be equal to F1*L. It may also be shown mathematically that if all the applied force (F1) over a power stroke were convertible to useful work, the work would be F1*$\pi$*L, and $\pi$*L in this expression is equal to the arc length described by the outer end of a crank arm at distance L from the rotational center in the frame, over the ½ revolution of the power stroke. The ratio of the theoretical maximum work to the actual is the mathematical constant $\pi$, which is approximately 3.14159. The actual work is 1/$\pi$, or about 31.8% of the theoretical maximum work. The concept of the power stroke is convenient, because it repeats for each ½ revolution of the crank and sprocket, and the total work over any period can be related to the number of power strokes.

One clear difficulty with the conventional crank and sprocket arrangement is the fact that not all of the force applied by a rider is convertible to useful work. As is evident by the force analysis presented above, including the graph of FIG. 4, the force doing work is only equal to the maximum force applied to the pedals by a rider at one instant in the power stroke, when the crank arm is horizontal as shown in FIG. 3C, and F2=F1. At all other times F2 is less than F1. As a result, much effort may be wasted by a rider, particularly near the beginning and end of a power stroke, when most of the force applied by the rider is absorbed by the frame, and only a small portion goes into producing torque to propel the bicycle. Clearly what is needed is a mechanism to make more use of the forces a rider may apply to propel the bicycle.

SUMMARY OF THE INVENTION

A new and important apparatus is provided for enhancing the ability of a rider to propel a bicycle, making it possible to provide a significant increase in useful work that a rider may impart to the bicycle. In addition, the force applied to the bicycle becomes much smoother with the apparatus, and the ride itself is also much smoother due to the shock absorbing nature of the apparatus.

According to a preferred embodiment of the invention, an apparatus for converting an applied driving force to rotary power is provided having a frame support element for supporting the apparatus. A crank is included having at least one arm portion, the crank having also an axial portion at substantially a right angle to the arm portion, with the crank rotatably mounted about a center axis of the axial portion in the frame support element. A sprocket is rotatably mounted to the frame support element perpendicular to the axial portion of the crank and mounted about a common rotary center with the crank. A guide element is fixedly attached to said sprocket, and a sliding member is configured to engage the guide element, the guide element being for constraining the sliding member to move along the guide element in a path adjacent to the sprocket and in a plane substantially parallel to the plane of the sprocket. The sliding member is also configured to engage the arm portion of said crank such that rotation of said crank will urge the sliding member along the guide element. A spring element is including bearing on both the guide means and on the sliding member such that the spring element is deformed as the sliding member is urged along the guide element. The crank is rotatable relative to the sprocket such that during a power stroke beginning with the arm portion of the crank extending vertically upward and ending with the arm portion extending vertically downward, an applied force on the pedal assembly having a force component perpendicular to the arm portion in the direction of rotation of the sprocket, will cause the arm portion to advance rotationally ahead of the sprocket position during about the first one half of the power stroke, urging the sliding member along the guide element, and deforming the spring element. The spring element thus stores the work performed on the spring as potential energy. The relative rotation of the sprocket and crank decreases during approximately the second one half of the power stroke with the spring element releasing the stored potential energy to the sprocket. Thus the invention provides a practical arrangement to increase the work that may be done without requiring an increase in the magnitude of the force applied to the crank.

BRIEF DESCRIPTION OF THE DRAWINGS

FIG. 5C shows the position of the crank relative to the sprocket with the spring uncompressed.

FIG. 10 is a table of calculated values based upon a particular example of a crank and sprocket of the prior art and one according to a preferred embodiment of the invention.

FIG. 11 is a graphical representation showing the forces involved in operation for the preferred embodiment for a particular case.

DETAILED DESCRIPTION OF THE PREFERRED EMBODIMENTS

Figure 5A:
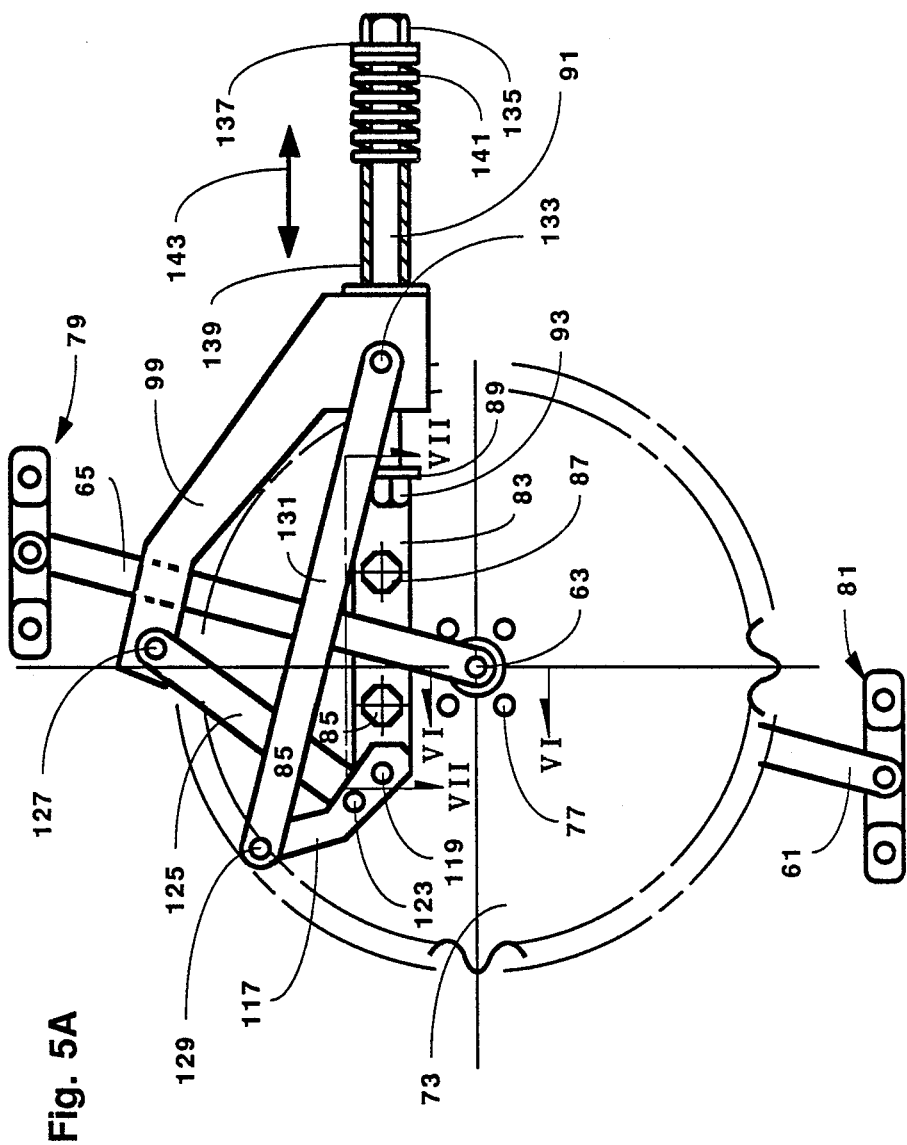
FIG. 5A is a side elevation view of a crank and sprocket assembly according to a preferred embodiment of the invention, with element numbers.
Figure 6:
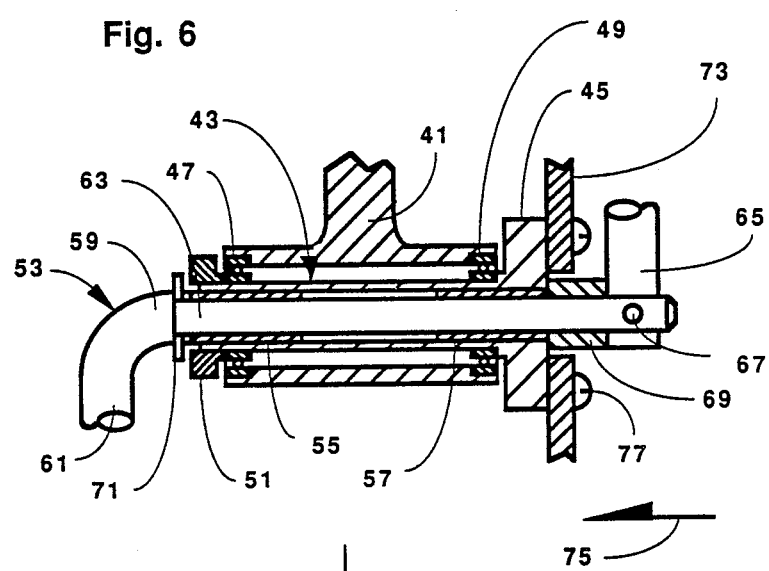
FIG. 6 is a partial section view taken along line VI—VI of FIG. 5A.

FIG. 5A is a side elevation view of a crank and sprocket drive according to a preferred embodiment of the invention. FIG. 6 is a sectioned view illustrating how the drive according to the preferred embodiment is mounted to the frame of a bicycle.

An important difference between the drive according to the preferred embodiment and a conventional crank and sprocket drive is shown by FIG. 6. In a conventional drive the crank and the sprocket are fixedly attached and rotate about the center of rotation at the frame element as a single member. In the preferred embodiment of the present invention the crank and the sprocket rotate about the same center of rotation, but are separately rotatably mounted in the frame element and are therefore free to rotate relative to one another as well as relative to the frame element.

Figure 2:
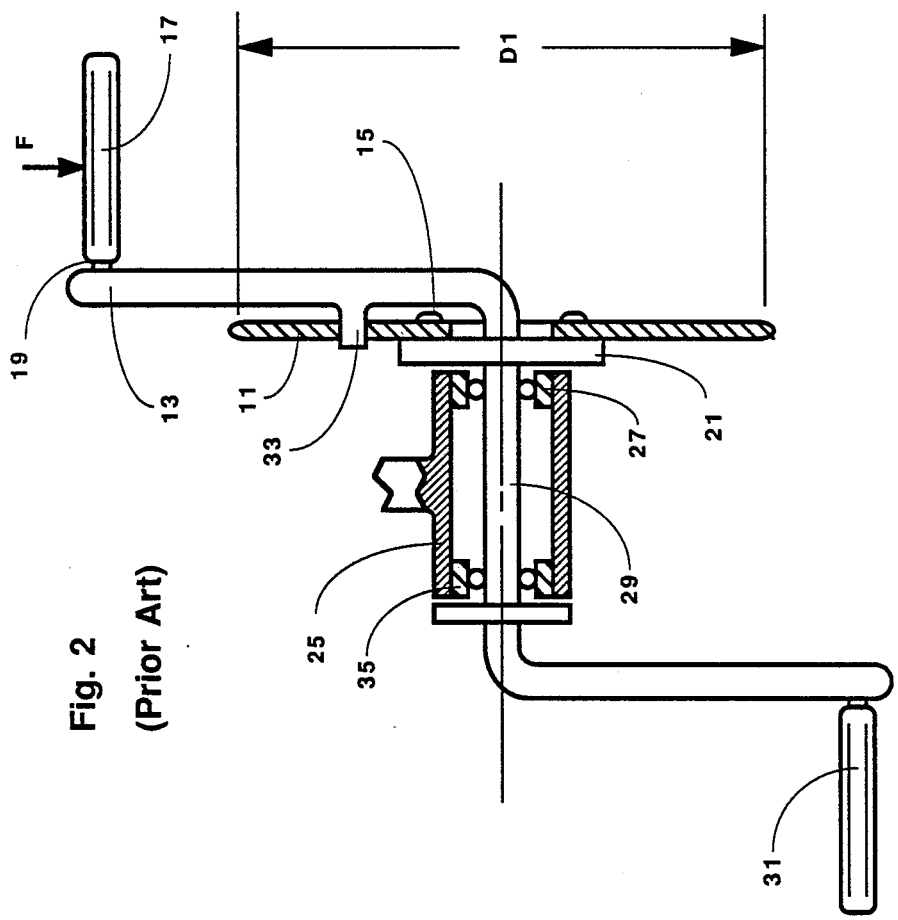
FIG. 2 is a section view taken along the section line II—II of FIG. 1.
Figure 3A:
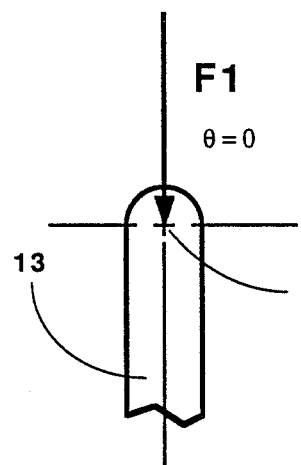
FIG. 3A is a partial view of a prior art crank in a vertical position with a force applied.
Figure 3B:
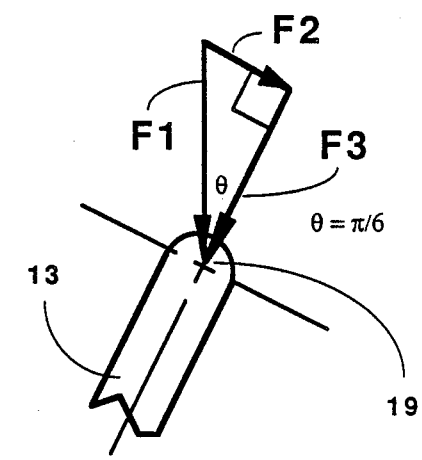
FIG. 3B shows a prior art crank partially rotated and the vector summation of forces on the crank.
Figure 3C:
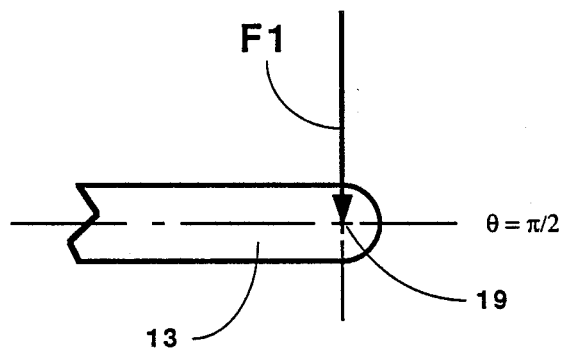
FIG. 3C shows the crank of FIG. 3A and FIG. 3B rotated to a position of 90 degrees from the vertical.
Figure 3D:
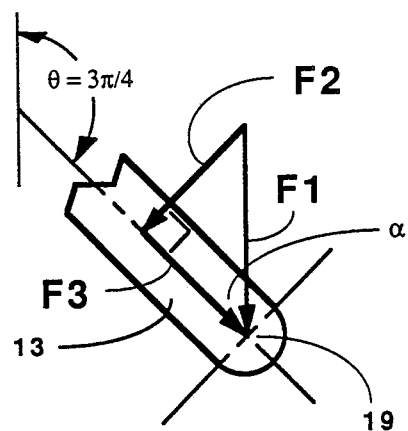
Figure 3E:
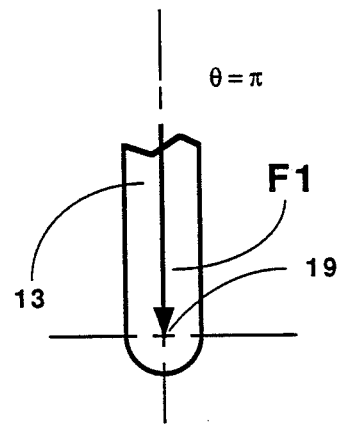
Figure 4:
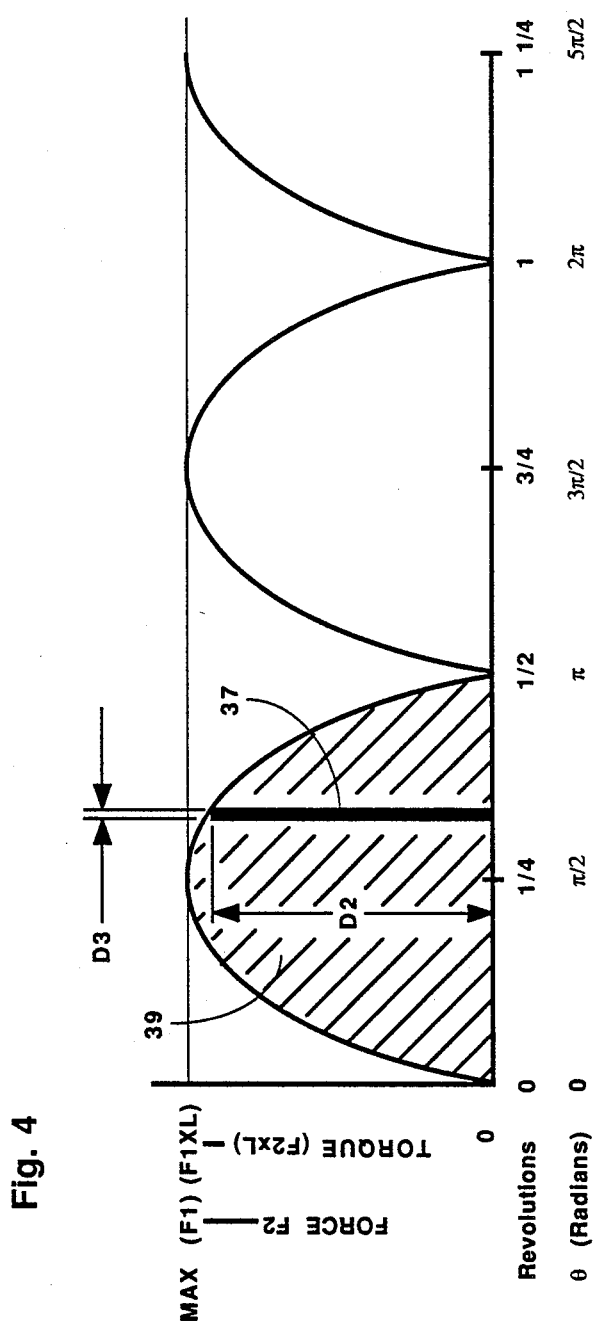
FIG. 4 is a graphical representation of the forces, torque and work relative to a crank and sprocket of the prior art.

Frame element 41 of FIG. 6 is similar to element 25 of FIG. 2. A bearing spindle 43 with a flange 45 at one end is rotatably mounted by ball bearings 47 and 49 through frame element 41. Suitable shoulders are machined on the spindle and the frame bore to accept and retain the bearings. The end of the spindle opposite flange 45 is suitable threaded to accept a retainer 51 by which the spindle may be secured in the frame.

A crank assembly 53 passes through a central hole in spindle 43 and is rotatably mounted to the spindle by journal bearings 55 and 57. The crank assembly has two primary portions to facilitate the rotatable mountings. Portion 59 has a crank arm 61 at right angles to the axis of rotation of the assembly, ending in a conventional pedal assembly (not shown), and an axial portion 63 that passes through the two journal bearings 55 and 57. A second portion of crank assembly 53 is a crank arm 65 similar to crank arm 61 and ending also in a conventional pedal arrangement (not shown). Crank arm 65 is mounted to axial portion 63 by means of a drift key 67 familiar to those skilled in the art. A spacer bushing 69 and a spacer washer 71 help to align and retain the crank assembly in the bearings.

In the preferred embodiment, as is subsequently shown in greater detail, the crank and sprocket rotate together in continuing revolutions within the frame, requiring continuing rotation of ball bearings 47 and 49. The rotation of crank assembly 53 within and relative to spindle 43, however, is reciprocal, encompassing only a fraction of a single revolution. This is the reason that ball bearings are chosen for the one service and journal bearings for the other, for the preferred embodiment. Other kinds of bearings, such as tapered roller bearings or needle bearings could be used, and it will be apparent to those skilled in the art that there are many other ways the mounting of the elements could be accomplished to provide the relative rotational freedom illustrated. In addition to the rotational elements, FIG. 6 shows a sprocket 73 fixedly attached to flange 45 of spindle 43 by conventional fasteners 77 such that the sprocket rotates with the spindle about the same axis of rotation as the crank assembly.

FIG. 5A shows a side elevation view of the drive of the preferred embodiment in the direction of arrow 75 of FIG. 6. Sprocket 73 is fixedly mounted to spindle 43 (not seen in FIG. 5A) by fasteners 77. Crank arm 65 ends in pedal arrangement 79 and is fixed to axial portion 63 of the crank assembly by drift key 67 (not shown in FIG. 5A). Crank arm portion 61 on the side of the sprocket and frame opposite arm 65 ends in pedal arrangement 81. The arrangement of the crank and pedals is thus quite similar to the conventional arrangement from the viewpoint of a rider of the bicycle, and the crank may be operated in much the same manner as a conventional crank for a bicycle.

A difference in the apparatus of the preferred embodiment and the conventional crank and sprocket arrangement is the manner in which force applied to the pedals is transmitted by the crank to the sprocket. In the conventional arrangement illustrated above in considerable detail, a portion of the force applied downward on a pedal is directed along the crank arm and does no work, and a portion perpendicular to the crank arm supplies torque, and hence work over time, to the crank and sprocket rigid assembly.

Figure 7:
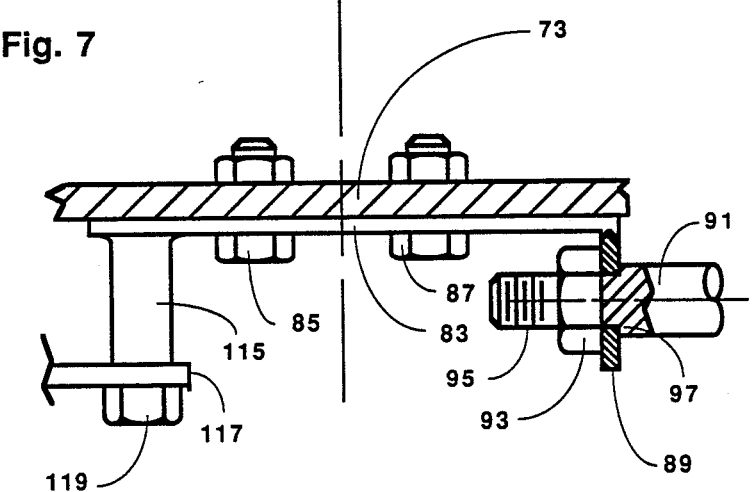
FIG. 7 is a partial section view taken along line VII—VII of FIG. 5A.

In the apparatus of the preferred embodiment the crank and sprocket may rotate about a common axis of rotation but are not fixedly attached to one another. If there were no connection between the two to restrict the relative rotation, there could be no force transferred from the crank to the sprocket, hence to another sprocket to propel the bicycle. The connection between the two (crank and sprocket) in the preferred embodiment is a resilient connection comprising a mechanism of multiple links shown in FIG. 5A. A bracket member 83 is a fixed link of the mechanism, and is firmly and fixedly attached to sprocket 73 by fasteners 85 and 87. As illustrated in FIG. 7, the bracket has a flanged end 89 to which a rod member 91 is rigidly attached by a conventional nut fastener, the rod having a threaded projection 95 from a shoulder 97 for this purpose. FIG. 7 shows a plan view from above of bracket 83, fasteners 85 and 87, flange portion 89, a part of rod 91, and nut 93 to show in clearer detail how the rod, bracket and sprocket are connected in the preferred embodiment.

Figure 8:
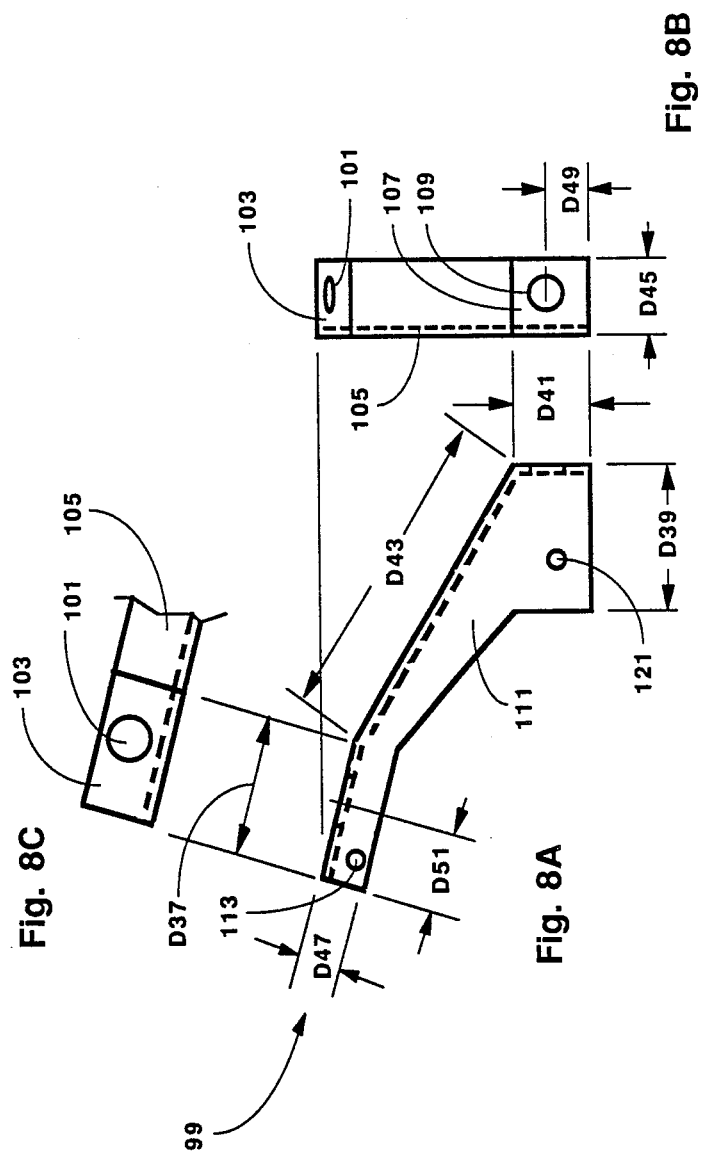
FIG. 8A is a side elevation of a sliding member according to the preferred embodiment.
FIG. 8B is an end view of the member of FIG. 8A.
FIG. 8C is a plan view of the member of FIG. 8A.

FIGS. 8A, 8B and 8C show three orthogonal views of a sliding member 99 to better illustrate its construction. Member 99 is a weldment of several substantially flat pieces of steel plate, the plate material being about 0.3 cm. in thickness. Sliding member 99 has a hole 109 by which it mounts upon and slides along rod 91, and a second hole 101 through which crank arm 65 passes. Hole 101 in portion 103 is about 2 cm. in diameter, and is the hole through which crank arm 65 passes. Arm 65 is smaller in diameter than hole 101 by about 0.3 cm., so there is a loose fit between the two. The clearance is sufficient that crank 65 may be at right angles to the hole, and may also incline relative to the hole by as much as about 20 degrees without binding in the hole.

Portion 105 is another substantially flat plate of the weldment of member 99, and has the purpose of adding strength to the structure. Portion 107 is also a substantially flat plate, and has a hole 109 approximately centered on the plate. As indicated earlier, hole 109 is the opening through which rod 91 passes. Rod 91 is typically about 1 cm. in diameter and extends about 15 cm. from flange 89 of bracket 83 in assembly. Hole 109 is a fraction of a centimeter larger in the preferred embodiment to provide a slip fit, so that member 99 may slide freely along rod 91. Flat plate 111 is a side member of the weldment of member 99, and provides strength and rigidity to the member. Plate 111 has two holes 113 and 121 which are configured for pivotal pin joint connections to other links of the mechanism connecting crank assembly 53 and sprocket 73. In the preferred mode, typical lengths of the various elements for member 99 are as follows: D37 is 3.8 cm.; D39 is 3.8 cm.; D41 is 2.5 cm.; D43 is 10.2 cm.; D45 is 2.5 cm.; D47 is 1.3 cm.; D49 is 1.3 cm.; and D51 is 2.5 cm.

Bracket 83 has a projection 115 in the preferred embodiment which is a welded extension of the bracket, seen in FIG. 7, and the projection ends in an internal thread at which point one end of a rotating first link 117 is connected by a shoulder bolt 119, the shoulder bolt forming a pin joint of the mechanism. Link 117, which rotates about pin joint 119 relative to bracket 83, has a similar pin joint 123 at which point one end of a connecting third link member 125 is connected. The other end of link 125 is connected at yet another pin joint 127 to sliding member 99, and this connection is near hole 113 of the sliding member (FIG. 8A). Rotating link 117 has a third pin joint 129 at the end opposite pin joint 119, and this joint is a connection to a connecting second link 131 which is joined at its opposite end to sliding member 99 at pin joint 133.

Rod 91 has an internal thread in the end opposite its mounting to flange 89 of bracket 83, and a bolt 135 with a flat washer 137 form a shoulder to capture a compression spring 141 and a cylindrical bushing 139 between sliding member 99 and the end of rod 91. Bushing 139 is shown sectioned in FIG. 5A so that rod 91 may be easily seen. Bushing 139 is convenient to fill the space between spring 141 and sliding member 99, but is not required if a spring is chosen that is long enough to fill the space without a bushing.

Figure 5B:
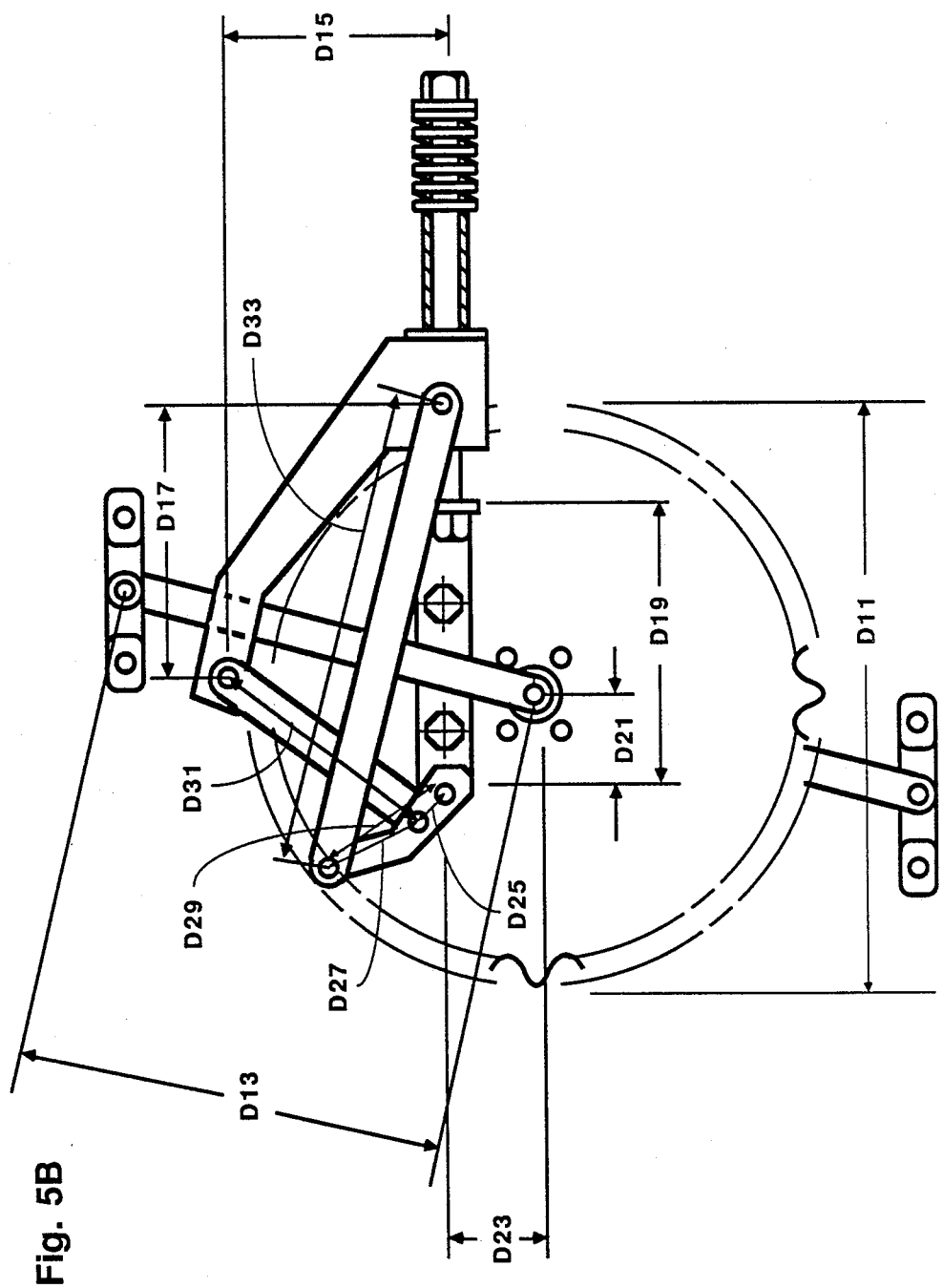
FIG. 5B is a side elevation view similar to FIG. 5A, but with dimension notes rather than element numbers.

FIG. 5B is the same as FIG. 5A which shows the preferred embodiment of the crank and sprocket combination, except that the element numbers have been removed to allow the addition of dimension lines, so that that typical dimensions of elements of the preferred embodiment may be shown.

In FIG. 5B, D11 is the diameter of sprocket 73 in the preferred embodiment, and is typically about 28 cm. D13 is the length of both crank arms 61 and 65, and is about 23 cm. Fixed link 83 has a length D19 from the flanged end to pin joint 119 of about 10.8 cm., and is mounted on sprocket 73 such that D21, the distance from the orthogonal projection of axial portion 63 onto link 83 to the center of pin 119, is about 4.5 cm., and D23. The separation of the center line of member 83 from the axial protion 63, is about 2.5 cm. Rod 91 fixed in the flanged end of member 83 is about 1 cm. in diameter and extends about 15 cm. from the flange. Sliding member 99 slides along rod 91 against spring 141, and the height D15 of member 99 from the center of rod 91 to pin joint 127 is about 10.2 cm. The length D17 of member 99 from pin joint 133 to pin joint 127 is about 9 cm.

Rotating link 117 pivots about pin joint 119 relative to fixed link 83. Link 125 connects pivotally at one end to link 117 at joint 123 and at the other end to member 99 at joint 127. Dimension D25 in the preferred embodiment between pin joints 119 and 123 is about 5.1 cm., and dimension D27 between pin joints 123 and 129 is about 4.8 cm. Although D27 is shown larger than D25 in the figures, it should be appreciated that the drawings are not to scale and have been made to represent a general situation, not just the preferred mode. Pin joints 119, 123 and 129 are not in line in the preferred embodiment, and D29 between joints 119 and 129 is about 8.9 cm. The resulting angle between a line joining joints 119 and 123, and a line joining joints 123 and 129 is about 127 degrees. In the preferred mode, the center of pin joint 119 is in line with bolts 85 and 87.

Length D31 of link 125 from pin joint 123 to pin joint 127 is about 12 cm. in the preferred embodiment, and length D33 of link 131 from pin joint 127 to pin joint 133 is about 19.4 cm.

Spring 141 in the preferred embodiment is a coil compression spring of free length about 7.6 cm., which dimension is not shown in FIG. 5B, as the spring is shown depressed by an amount of about 2.5 cm. The spring in the preferred embodiment has a proportional constant of about 225 pounds force per inch deflection. In FIG. 5A the conventional "forward" direction for rotation of the crank and sprocket assembly is clockwise, and this direction will be assumed for explanation and analysis. During the operation of a bicycle using a crank and sprocket arrangement according to the preferred embodiment, at an instant in time when one or the other of the crank arms is vertical relative to the bicycle frame, and assuming that the force applied to a pedal assembly by an operator is also vertical relative to the bicycle frame, all of the force will be along the axis of the crank arm, and there will be no component of the force at that instant at a right angle to the crank arm to provide a driving torque. As the crank rotates past this vertical position the downward force applied to a pedal is no longer colinear with the crank arm, and there is a component at a right angle to the crank arm. This component applies a torque to the sprocket, just as in the conventional case (but not necessarily at the same magnitude relative to time), by applying a force to sliding member 99 in the direction along the axis of rod 91 away from flange 89 of fixed link 83. The movement of member 99 is always in one of the directions of arrow 143. This force causes compression of spring 141 by an amount proportional to the magnitude of the force relative to the spring "rate" or "constant" K, which allows sliding member 99 to move along rod 91 by an amount equal to the spring compression. The amount of movement of member 99 is determined by the balance between the force applied to member 99 by the crank arm and the force applied to member 99 in the opposite direction by the compression spring. At the point that these two forces are equal (being opposite in direction) there will be no further movement of member 99 relative to rod 91.

Movement of member 99 away from flange 89 of link 83 allows crank assembly 53, including arms 61 and 65 to rotate relative to sprocket 73 so that the rotation of the crank assembly is more than the rotation of the sprocket. In FIG. 5A crank arm 65 is shown rotated about 10 degrees ahead of sprocket 73, and member 99 is away from flange 89 by a proportional amount. As crank 65 rotates ahead of the rotation of sprocket 73, link 125 causes link 117 to rotate about pin joint 119, and link 131, being connected at pin joint 129 to link 117, bears on member 99 at pin joint 91 also in the direction away from flange 89.

Figure 9:
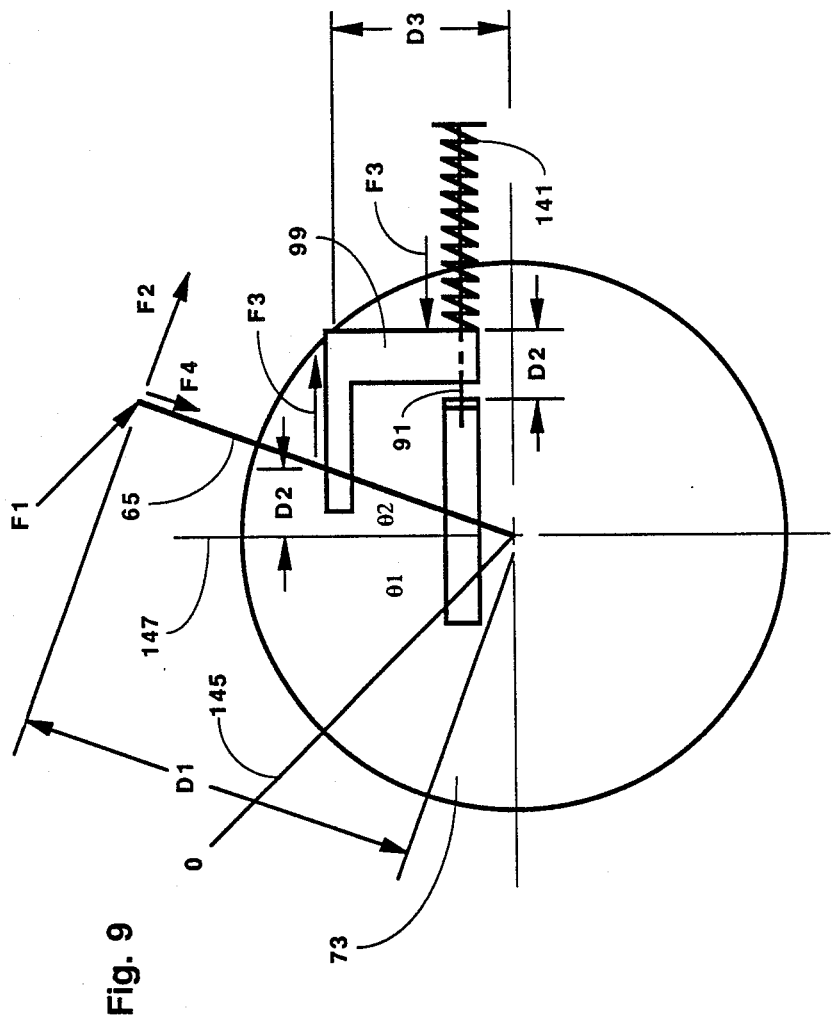
FIG. 9 is a schematic of the arrangement of the preferred embodiment to show the resolution of forces involved in operation.

FIG. 9 is a schematic diagram of the arrangement of the preferred embodiment with links 131, 117 and 125, and the associated pin joints not shown, and represents the general case for the elements of the preferred embodiment with an applied force F1. Radius 145 is marked 0, and is the position at which crank arm 65 is vertical relative to the bicycle frame. At the time shown by FIG. 9, sprocket 73 has rotated through an angle $\theta 1$. Force F1 is shown applied to crank 65 in a direction colinear with radius 145, which is the vertical downward direction. The point of application of force F1 is at the end of the crank arm, at a distance D1 from the center of the sprocket and crank assembly (the length of crank arm 65).

Force F1 may be resolved by the application of vector analysis into components colinear with the axis of and perpendicular to the crank arm. F2 is the perpendicular component. F4 is the component colinear with the axis of the crank arm. The force on crank 65 causes the crank to bear against member 99. If the contact between the crank and the hole in member 99 through which it passes is considered to be frictionless, the force F3 applied to member 99 by arm 65 will be in the direction of movement of member 99 along rod 91. Force F3 will cause member 99 to move away from link 83 along rod 91 and spring 141 will apply a force proportional to the amount of movement D2 until the spring force is equal to and balances force F3.

The movement of member 99 by distance D2 allows rotation of link 65 by an angle $\theta 2$ in addition to the sprocket rotation $\theta 1$. Therefore, as the sprocket rotates by angle $\theta 1$ the crank assembly rotates by angle $\theta 1 + \theta 2$. It was shown in the conventional case, in which the crank and sprocket are fixedly attached, that:

$$F2 = F1 * \mathrm{Sin}(\theta 1)$$

In the present case, where the crank assembly may rotate ahead of the sprocket by an amount $\theta 2$ allowed by the movement of member 99 against spring 141 it may be similarly shown that:

$$F2 = F1 * \mathrm{Sin}(\theta 1 + \theta 2)$$

At any instant in time, such as the instant represented by FIG. 9, the geimetry of the situation dictates the distribution of forces within the system. Since F1 is the only force applied to the mechanical system, and F1 is resolved into a component along the crank, which component may do no work on the system, and a component F2 which applies a torque F2*D1; and the point at which crank 65 touches member 99 and applies force F3 to that link is the only point of contact between the crank and the rest of the system:

$$F2 * D1 = F3 * D3$$

By substitution and rearrangement it may be shown that:

$$F3 = F1(D1/D3)[\mathrm{Sin}(\theta 1 = \theta 2)]$$

The principles of trigonometry yield:

$$\mathrm{Tan}(\theta 2) = D2/D3$$

The principles of mechanics relative to compression springs require:

$$F3 = K*D2$$

where K is the spring rate, also called the spring constant, given in terms of force per unit length of deformation.

Links 117, 125 and 131 are not shown in FIG. 9 since they are not necessary to an analysis relative to the torque applied to the system by F1 and the work done on the system by reason of the torque. Further, it is believed that it is the ability of the invention to increase the torque, and hence the work done, that is a major advantage of the invention over the conventional sprocket system. At any point in time, the torque is F2*D1. Since F3 is the only force applied to member 99 by the crank, F3*D3 also represents the torque. In the absence of links 117, 125 and 131, the torque would be applied by F3 around the movement arm D3. It is believed that the linkage of elements 117, 125 and 131 redirects the forces, so that the force applied to member 99 in the direction of its translation along rod 91 is more nearly along the axis of rod 91 than would be the case if the links were not there. Thus, the linkage has the beneficial effect of reducing the bending movement that would otherwise be applied to rod 91, so that a linear bearing is not required between member 99 and rod 91.

The above derived relationships relative to the general case for the preferred embodiment with reference to FIG. 9 may be used to fully illustrate the operation compared to the operation of a conventional crank and sprocket. For example, the "torque force" F2 in the conventional case is given by:

$$F2 = F1 * \mathrm{Sin}(\theta 1)$$

while in the present case for the preferred embodiment:

$$F2 = F1 * \mathrm{Sin}(\theta 1 + \theta 2)$$

The trigonometric function Sine has a value that varies periodically between 0 and 1 starting at 0 for an angle 0 and reaching maximum 1 at 90 degrees, after which the value declines again to 0 at 180 degrees, then the cycle repeats. It may be seen by comparing the two mathematical expressions that the maximum value for F2 in each expression is the same, F1. This value occurs in the conventional case when $\theta 1 = 90$ degrees, and in the case of the preferred embodiment when $\theta 1 + \theta 2 = 90$ degrees. The maximum value of $\theta 2$ is also when $\theta 1 + \theta 2 = 90$ degrees, so F2 increases more rapidly in the case of the preferred embodiment, reaching the maximum value at the point that the sprocket has rotated an angular amount of 90 degrees minus $\theta 2$. Since the force F2 increases more rapidly in the first part of the power stroke for the case of the preferred embodiment than for the conventional case, more torque is applied to the system earlier in the power stroke, and more work is done on the system early in the power stroke.

the comparison may best be made by illustration of a particular case. For this comparison it will be assumed that a particular conventional sprocket has a crank length D1 of 9 inches, and the driving force F1, applied vertically downward throughout the 180 degree power stroke, is 100 pounds. For comparison, a crank and sprocket arrangement according to the preferred embodiment also has a crank length D1 of 9 inches and a driving force of 100 pounds applied vertically downward as in the conventional case. D3 for the case of the preferred embodiment is 4 inches, and spring 141 has been selected so that the maximum deflection D3 for the 100 pound driving force will be 1 inch. This selection can be made by test and iteration, or the value of the spring constant K may be calculated from the relationships derived from the general case. Bushing 139 is chosen so that with no driving force applied to a crank, there is no spring deflection and therefore no force on the mechanism due to the spring.

FIG. 10 is a table of values resulting from calculations based on the relationships derived for the general case of the preferred embodiment with the above particular values, and the value as well of F2 for a conventional case with equal F1 and crank length D1. There are 9 columns to the table, numbered across the top. Column (1) lists values of total crank revolution from arbitrary 0 at vertical up position to 180 degrees at vertical down position. Column (2) lists the values of sprocket revolution at each of the points of crank revolution, and column (3) lists the value of revolution of the crank beyond the revolution of the sprocket, due to the compression of the spring. The values for column (2) and column (3) at each position of the crank add to the value of column (1). It is seen that at the beginning of the 180 degree power stroke there is no advance of the crank ahead of the sprocket ($\theta2=0$). $\theta2$ gradually increases during the first half of the power stroke, then decreases during the second half to reach zero again at the end of the stroke. The value of $\theta2$ is maximum at the point that crank rotation is 90 degrees, and at this point the sprocket has rotated only about 76 degrees. As a result, the torque force F2 (column (5)) of the preferred embodiment becomes maximum at 100 pounds while the sprocket rotation is about 76 degrees (column (2)). The torque force for the conventional case (column (9)) is, at this point of crank rotation, only 97 pounds, about 3% less than for the case of the preferred embodiment. Beyond about the midpoint of the power stroke the torque force for the conventional case becomes greater than the torque force for the case of the preferred embodiment.

The situation for the given assumptions is shown more clearly by FIG. 11, which is a graphic plot of the torque force F2 for both the conventional case and the case of the preferred embodiment over 180 degrees of revolution of the sprocket at 10 degree intervals, the plotted values taken from the table FIG. 10. The reason for plotting relative to revolution of the sprocket is that in steady operation the sprocket revolves at a constant rate in both the conventional case and the case of the preferred embodiment, while the crank, in the case of the preferred embodiment rotates relative to the sprocket.

In FIG. 11 curve 149 is a graph of the torque force F2 for the case of the preferred embodiment, and curve 151 is a graph of the torque force for the conventional case with the same crank length D1. If, in each case, the force is multiplied by the crank length D1, the result is the torque applied to the sprocket under the given conditions; and the area under each curve, representing the integration of the torque curve, represents also the work done on the system by the torque force.

Figure 1:
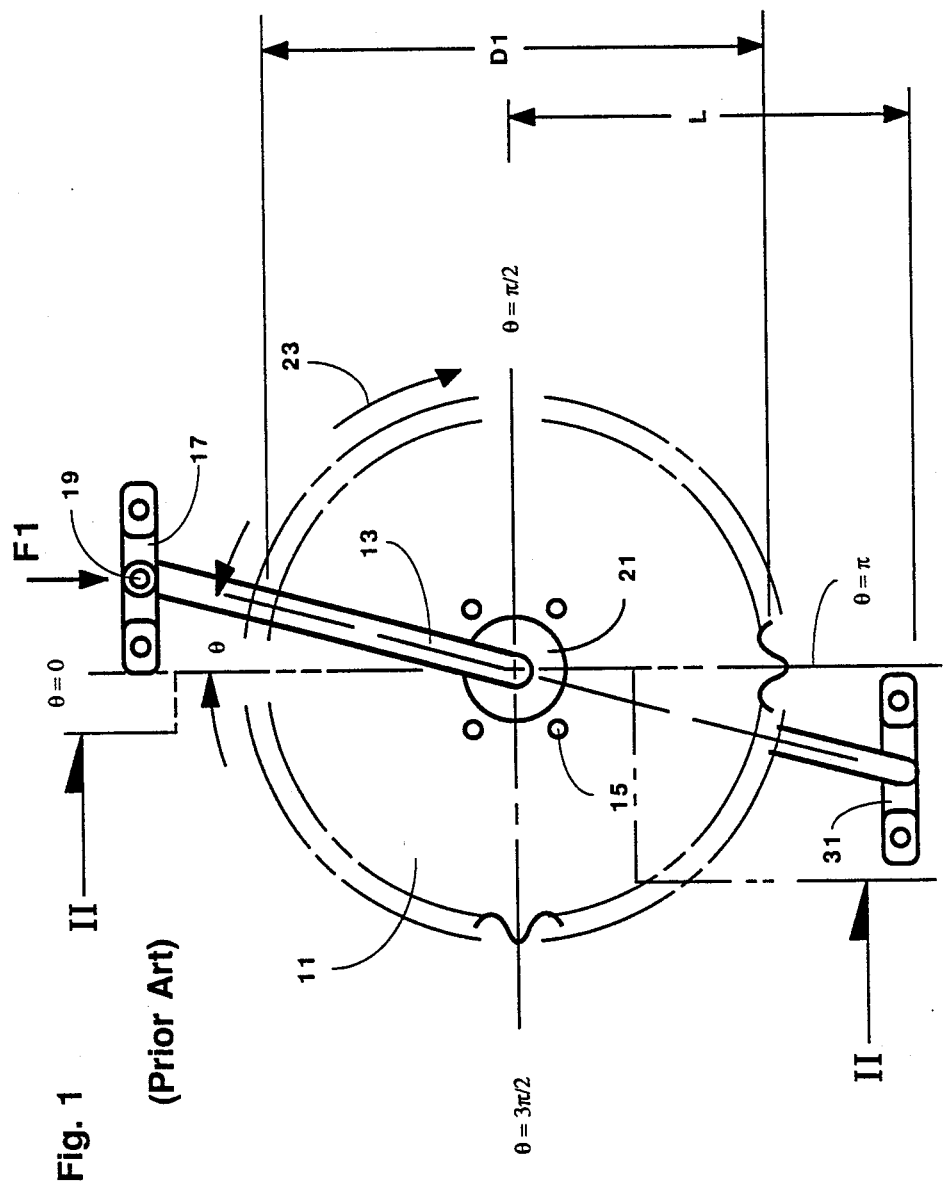
FIG. 1 is a side elevation of a prior art crank and sprocket arrangement.

Examination of FIG. 1 illustrates that the work done by the torque force on the system in the case of the preferred embodiment over about the first half of the 180 degree power stroke is greater than the work done by the torque force in the conventional case, and the difference is illustrated approximately by shaded area 153 between the two curves. Assuming that applied force F1 is maintained throughout the 180 degree power stroke, the conventional case provides more work by the torque force over about the second half of the power stroke, and the difference is represented approximately by shaded area 155, which is approximately the same as area 149. Under the assumed conditions, it might appear that more work is done during the first half of the stroke, but that about the same amount less work is done in the second half. Such a conclusion would be erroneous, however, since it ignores the work done on the system by compressing the spring.

During about the first half of the power stroke while spring 141 is being compressed by length D2, work is done on the spring that does not appear as work done on the system. Assuming a spring with a proportional rate, the amount of work done is equal to one-half of the final force on the spring multiplied by the compression distance D2. In the above example the final force on the sring is F3 at crank rotation of 90 degrees, and is 225 pounds. D2 in the example is 1 inch, so the work is 112.5 inch-pounds. This work is stored as potential energy in the spring in about the first half of the power stroke, and released as work done on the system during about the second half of the power stroke.

It was illustrated mathematically above by the methods of integration that the work done in a single power stroke of 180 degrees in the conventional case is F1 multiplied by the crank arm length. In the above comparison example the applied force is 100 pounds and the crank arm length is 9 inches, so the work done in a single power stroke is 900 inch-pounds. The work done on the spring by virtue of the mechanism of the preferred embodiment, that is added to the system during the second half of the power stroke is 112.5 inch pounds, about a 12.5% increase over the work done in the conventional case., a significant improvement.

In addition there is a second condition that further improves the situation even more for the case of the preferred embodiment. This condition is related to the fact that the applied force, in the example assumed to be 100 pounds, cannot be maintained over the entire power stroke of 180 degrees. An operator of a crank can anticipate the rotation of the crank and apply the force as the crank arm comes to the vertical position, but the operator must begin to release the applied force before the crank reaches the vertical down position. This condition is due to normal physical reaction time. An operator will usually apply a substantially consistent force over the first one-half of the 180 degree power stroke, then begin lowering the force until no significant force is applied to a pedal after about 135 degrees. As a result, the advantage of the conventional crank over the second half of a power stroke is much less than the advantage of the preferred embodiment over the first half of the same power stroke.

Figure 12:
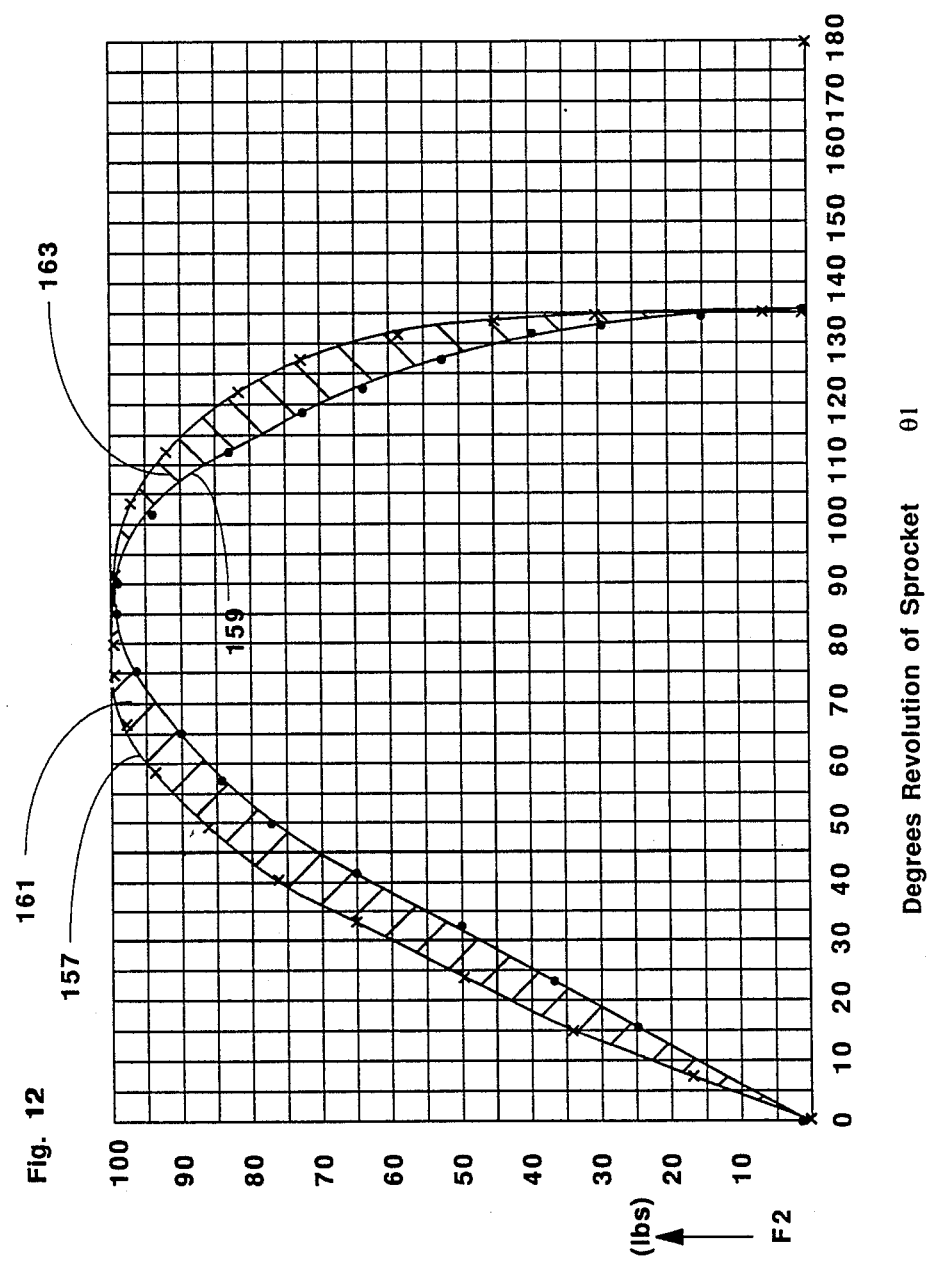
FIG. 12 is another graphical representation of forces involved in operation for the preferred embodiment in a case more representative of practical application than that of FIG. 11, and showing also the effect of work done by a spring of the invention.

FIG. 12 shows an approximation of the actual case comparing again the examples previously compared by FIG. 11. Curve 157 is the force curve for the preferred embodiment, and curve 159 is the force curve for the conventional case. The applied force is reduced gradually in the second half of the power stroke until no force is applied after about 135 degrees (in both cases). Also, curve 157, representing the torque force F2 for the case of the preferred embodiment has been increased in the portion of the power stroke beyond about 90 degrees to represent the additional work of about 12.5% done on the system by the extending spring giving up its stored energy to the system. This increase results in curve 157 for the preferred embodiment demonstrating more torque force everywhere in the power stroke than curve 159 representing the conventional case. Because of this, shaded areas 157 and 163 both represent additional work done on the system over the conventional case. The additional work done without increasing the applied force, by virtue of the crank and sprocket arrangement of the preferred embodiment is about 20% more than for the conventional case with the same force application and crank arm length.

An additional benefit of the apparatus of the invention is that the driving force imparted to the bicycle is very smooth, so that riding with the sprocket and crank of the invention is much less tiring than with a conventional crank and sprocket. Furthermore, the ride of the bicycle itself feels much smoother than being ridden on rough surfaces than a bicycle with a conventional crank and sprocket, presumeably due to the shock absorbing nature of the spring which acts to buffer any shock to the feet.

It will be clear to those skilled in the art that there are many changes that may be made without departing to any appreciable extent from the spirit and scope of the invention. The lengths of the various links may be changed, for instance, as well as the positions at which the pin joints are placed. The size and strength (rate) of the spring may be changed to suit the weight, strength and endurance of a rider. The length of a crank arm and the diameter of a sprocket may be changed as well. Also, the invention may be used with multiple sprockets of differing diameters fixed together; with a mechanism, known in the art, for moving a chain or a drive belt from one sprocket to another, thereby changing the overall mechanical advantage of the drive system. There are a large number of ways that bearings may be utilized in the mechanism to reduce the force and wear effects of friction, and the particular arrangement illustrated is but one such arrangement.

What is claimed is:

1. An apparatus for converting an applied driving force to rotary power comprising:
   frame support means for supporting said apparatus;
   a sprocket rotatably mounted to said frame support means;
   a crank for driving said sprocket; and
   resilient connecting means disposed between said crank and said sprocket such that application of force to said crank will deform said resilient connecting means and allow said crank to rotate relative to the rotation of said sprocket in said frame support means without increasing the throw of said crank;
   said resilient connecting means comprising:
      guide means fixedly attached to said sprocket;
      a sliding member configured to engage said guide means and constrained thereby to move along said guide means, and further engaging said crank such that rotation of said crank relative to said sprocket will urge said sliding member along said guide means; and
      spring means bearing on both said guide means and on said sliding member such that said spring means is deformed as said sliding member is urged along said guide means.

2. An apparatus as in claim 1 additionally comprising linkage means pivotally attached to said sliding member for directing the line of application of force applied to said sliding member.

3. An apparatus as in claim 2 wherein said linkage means comprises a first link pivotally connected at one end relative to said sprocket and pivotally connected at the opposite end to one end of a second link, said second link pivotally connected at the opposite end to said sliding member near the position of engagement of said sliding member with said guide means, and a third link pivotally connected at one end near the center of said first link and pivotally connected at the opposite end to said sliding member near the position of engagement of said sliding member with an arm of said crank, such that movement of said sliding member along said guide means will cause rotation of said first link relative to said sprocket by means of said second link, and said rotation of said first link will cause said third link to urge against said sliding member.

4. An apparatus as in claim 1 wherein said guide means comprises a bracket fixedly attached to said sprocket and a rod member fixedly attached to said bracket, said rod for guiding said sliding member.

5. An apparatus as in claim 4 wherein said sliding member comprises an assembly of substantially flat plates, one of said plates having a hole first therein for engagement with said rod member and another of said plates having a hole second therein for engagement with an arm of said crank.

6. An apparatus as in claim 1 wherein said spring means comprises a coiled compression spring, said spring constrained between a shoulder on said guide means and said sliding member.

* * * * *